United States Patent [19]

Dijkstra

[11] Patent Number: 5,173,701
[45] Date of Patent: Dec. 22, 1992

[54] RADAR APPARATUS WITH JAMMING INDICATOR AND RECEIVER DEVICE WITH JAMMING INDICATOR

[75] Inventor: Jan A. Dijkstra, Almelo, Netherlands

[73] Assignee: Hollandse Signaalapparaten B.V., Hengelo, Netherlands

[21] Appl. No.: 713,279

[22] Filed: Jun. 11, 1991

[30] Foreign Application Priority Data

Jun. 21, 1990 [NL] Netherlands ......................... 9001414

[51] Int. Cl.[5] .............................................. G01S 7/36
[52] U.S. Cl. ........................................ 342/17; 342/19
[58] Field of Search ......................... 342/16, 17, 18, 19

[56] References Cited

U.S. PATENT DOCUMENTS

| | | |
|---|---|---|
| 2,910,691 | 10/1959 | Rhyins ................................. 342/17 |
| 3,427,617 | 2/1969 | Richman . |
| 3,495,244 | 2/1970 | La Rosa . |
| 3,680,106 | 7/1972 | Foley . |
| 3,838,423 | 9/1974 | Di Matteo ....................... 342/17 X |
| 3,870,997 | 3/1975 | DiPerry ................................ 342/17 |
| 4,063,239 | 12/1977 | Johnson . |

OTHER PUBLICATIONS

Skolnik M. I. "Introduction to Radar Systems" McGraw Hill, pp. 160–163, 1980.

*Primary Examiner*—Mark Hellner
*Attorney, Agent, or Firm*—Oblon, Spivak, McClelland, Maier & Neustadt

[57] ABSTRACT

A radar apparatus is provided with a jamming indicator (11), the jamming indicator (11) having the same bandwidth as the preselector filter (15) of the radar receiver (5).

6 Claims, 2 Drawing Sheets

RADAR APPARATUS WITH JAMMING INDICATOR AND RECEIVER DEVICE WITH JAMMING INDICATOR

BACKGROUND OF THE INVENTION

The invention relates to a radar apparatus, provided with an antenna, a transmitting and receiving unit coupled to the antenna, whereby the receiving unit is provided with a broadband preamplifier stage, to which signals, received with the aid of the antenna are applied, and with a bandwidth-limiting element coupled to it, the radar apparatus being furthermore provided with a jamming indicator, coupled to an output of the receiving unit, which indicator is suitable for detecting at least a part of the interference signals, detected with the aid of the antenna and the receiving unit and which for this purpose generates an interference signal-representing indication signal.

The invention also relates to a receiver device provided with a similar jamming indicator.

Radar equipment, provided with jamming indicators, capable of determining the direction and the strength of signals from jamming sources, are known from the technical literature, for instance "Introduction to Radar Systems" by M. I. Skolnik and are described in the chapter "Electronic Counter-Counter Measures". Said jamming indicators aim at detecting interference signals, containing frequency components, which are substantially equal to the frequency of the transmitting unit. These frequency components can penetrate the entire receiving unit. In this respect, a substantial class of interference signals is overlooked, in particular signals, whose frequencies lie within the bandwidth of the preamplifier stage of the receiving unit, but differ possibly intentionally from the frequency of the transmitting unit. These signals cannot penetrate the receiving unit and cannot be detected with state-of-the-art jamming indicators. Providing they are of sufficient strength, these signals can saturate the preamplifier stage of the receiving unit, thus rendering the radar apparatus insensitive to incoming target echoes. It is even possible that an object emitting interference signals of the above-mentioned type, can approach the radar without being detected. The invention has for its object to provide a solution to this problem.

SUMMARY OF THE INVENTION

The invention is characterised in that the jamming indicator is coupled to the receiving unit at a point located before the bandwidth-limiting element.

BRIEF DESCRIPTION OF THE DRAWINGS

The invention will now be described in more detail with reference to the following figures of which.

DESCRIPTION OF THE PREFERRED EMBODIMENTS

Figure 1:
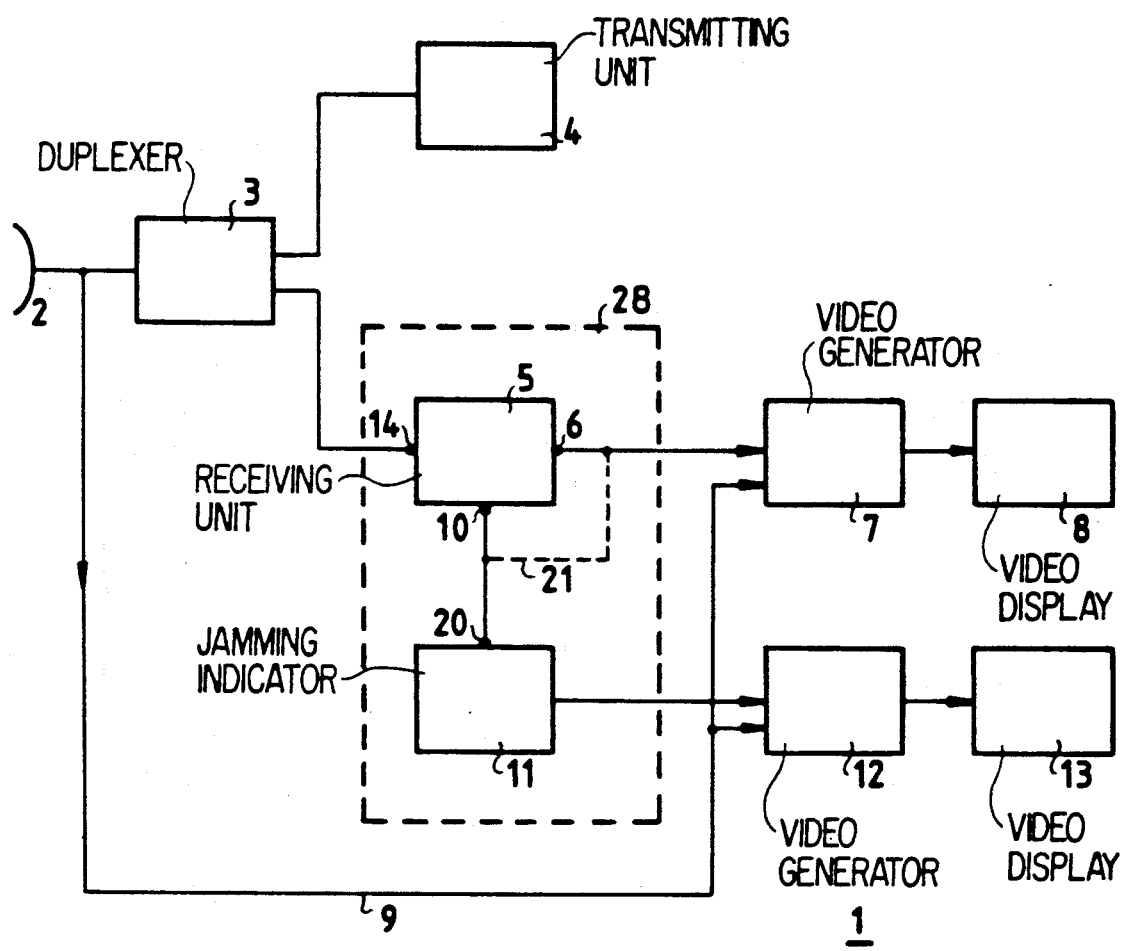
FIG. 1 represents a radar apparatus with a jamming indicator according to the invention.

FIG. 1 represents a radar apparatus 1. The radar apparatus 1 is provided with an antenna 2 which is connected with a transmitting unit 4 by way of a duplexer 3. The radar apparatus 1 may relate to both a tracking radar and a search radar. The transmitting unit 4 is suitable for the transmission of radar pulses having a frequency $f_0$. The echo signals reflected by targets are received with the aid of antenna 2 and are applied to the receiving unit 5 via duplexer 3. The radar echo signals are amplified in the receiving unit 5 and are converted to an intermediate frequency $f_m$. Via output 6, the receiving unit 5 controls a video generator 7 for presenting the received target echo signals on a video display 8. Both range and azimuthal direction of the target can be presented for display on the basis of established techniques.

The invention is however by no means confined to such a type of radar and is also applied to other types of radar such as 3-D radar systems. In the present case, the azimuthal direction of the target is derived from the momentaneous position of the antenna, which is fed to the video generator 7 via line 9.

According to the invention, the receiving unit 5 is also provided with a second output 10 through which interference signals, received by means of the receiving unit 5, are fed to a jamming indicator 11. The receiving unit 5 will now be described in more detail. As will be explained below, the jamming indicator 11 is provided with means for detecting interference signals. By interference signals is meant signals emitted, (usually as a result of deliberate jamming), which may severely degrade the performance of a radar apparatus.

The interference signals detected by the jamming indicator 11 are applied to a video generator 12, which adapts the interference signals for presentation on a video display 13. The video display 13 is also suitable for displaying both the strength and direction of the interference signal. As stated above, the direction ensues from the momentaneous direction of the antenna 2, which is supplied to the video generator 12 via line 9.

Figure 2:
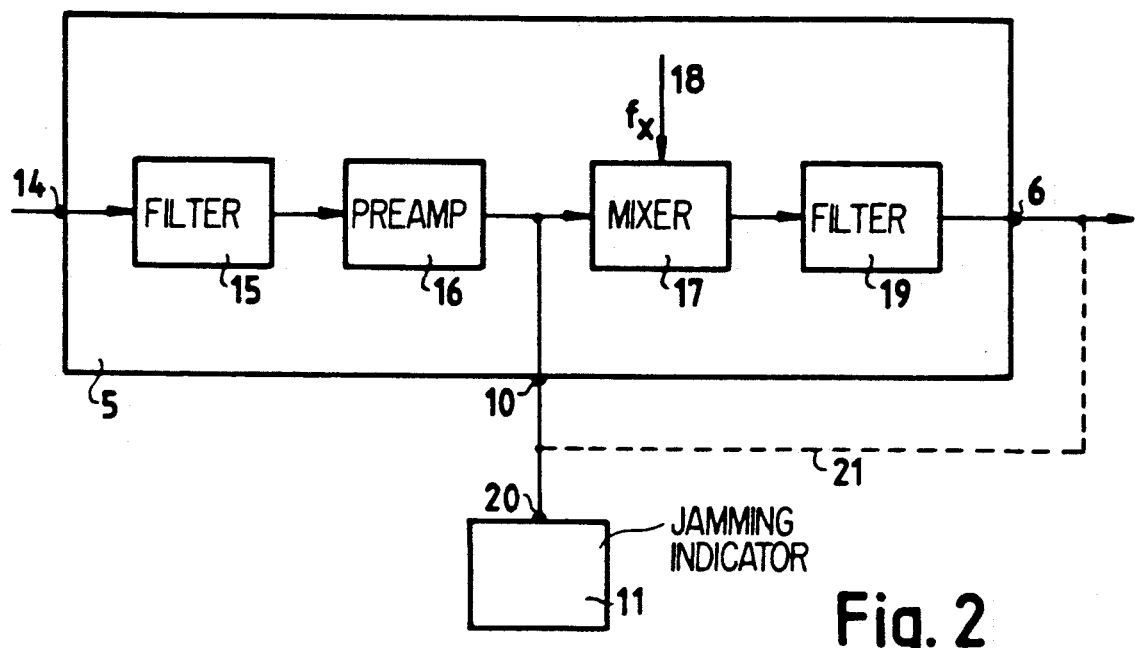
FIG. 2 represents an embodiment of the receiving unit of FIG. 1.

FIG. 2 represents a possible embodiment of the receiving unit 5, which is based on the superheterodyne principle. The input 14 is provided with a preselector filter 15 which only admits signals which lie within the operating frequency band of the receiver. The operating frequency band is usually limited only by international agreements concerning the use of radio and radar frequencies. In most cases the receiving unit 5 is provided with a preamplifier 16 which may increase the input sensitivity of the receiving unit 5. In a mixer stage 17, the filtered and amplified input signal is mixed with an oscillator signal $f_x$ (18). The difference frequency $f_m = |f_0 - f_x|$ thus obtained is applied to an intermediate frequency filter 19, producing the intermediate frequency signal $f_m$ at the output 6.

On the basis of established techniques, input 20 of the jamming indicator can be connected to output 6 of the receiving unit 5. In FIG. 1 and 2 this existing connection is marked by a dotted line 21. The signal bandwidth of output 6 is so small that only received signals of frequencies, which are substantially equal to the transmit frequency $f_0$ of the radar apparatus 1, can be detected. This is directly related to the operation of the intermediate frequency filter 19.

According to the invention, the input 20 of the jamming indicator 11 is connected to output 10 of the superheterodyne receiving unit 5, as presented in FIG. 1 and 2. This causes the dotted connection 21 to be dropped. The signal bandwidth of output 10 is far larger than the signal bandwidth of output 6. All signals which can pass the broadband preamplifier stage, comprising the preselector filter 15 and preamplifier 16, referred to in FIG. 2, are here available for processing in the jamming indicator 11. Due to the fact that the jamming indicator 11, according to the invention, is provided with signals operating in a larger bandwidth than the signals of output 6, a far wider range of interference signals can be detected and presented for display than is the case with state-of-the-art radars.

Figure 3:
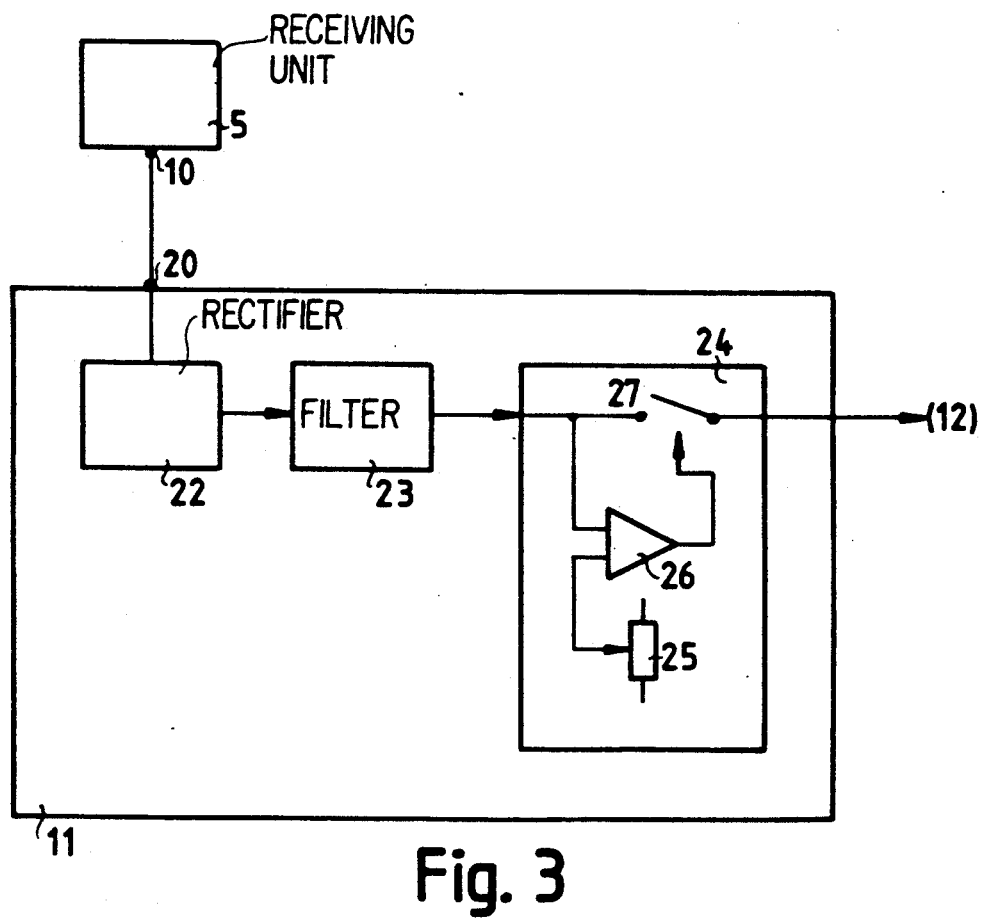
FIG. 3 represents an embodiment of the jamming indicator of FIG. 1.

FIG. 3 illustrates an embodiment of the jamming indicator 11. The signals originating from output 10 are rectified by rectifier circuit 22 and pass through a low-pass filter 23. The rectifier circuit 22 shall preferably have a bandwidth, which at least includes the bandwidth of the preamplifier stage. In this way all received interfering signals can be detected. The rectified and filtered signals are subsequently compared in threshold circuit 24 with an adjustable threshold voltage. To this end, the threshold circuit 24 is provided with an adjustable threshold voltage generator 25 and a comparator 26, to which the above-mentioned voltages are supplied. If the threshold voltage is exceeded, the rectified and filtered voltage will as a so-called indication signal be applied to the video generator 12 via switching means 27. The video generator 12 controls the video display 13, which is generally suitable for displaying the strength and the direction of the jamming source. Low-pass filter 23 and threshold circuit 24 prevent rectified, pulse-shaped radar echo signals from reaching the indication means, in the present case the video generator 12 and video display 13.

The receiving unit 5 and jamming indicator 11 can, according to the invention, also be designed as a single receiving unit 28, as indicated by a dotted line in FIG. 1, dotted line 21 having been dropped.

I claim:

1. A radar apparatus, comprising:
   an antenna;
   a transmitting unit and a receiving unit each coupled to said antenna wherein said receiving unit includes a broadband preamplifier stage, to which signals, received with the aid of said antenna are applied, said broadband preamplifier stage providing a broadband output, said receiver unit further including a bandwidth-limiting element receiving said broadband output; and
   a jamming indicator, operating in a bandwidth substantially equal to the preamplifier stage bandwidth, coupled to said broadband amplifier stage of said receiver unit wherein said jamming indicator receives at an input, said broadband output of said broadband preamplifier stage and wherein said jamming indicator generates an interference signal-representing signal suitable for controlling an indication means for displaying at least a part of any interference signals, said jamming indicator being provided with means for suppressing radar echo signals to that the indication signal substantially exclusively represents interference signals.

2. Radar apparatus as claimed in claim 1, wherein said means comprises a rectifier circuit coupled to the receiving unit, a low-pass filter coupled to the output of the rectifier circuit and, coupled to the output of the low-pass filter, an adjustable threshold circuit which generates the indication signal.

3. Radar apparatus as claimed in claim 2, wherein said threshold circuit is provided with a threshold voltage generator, which generates an adjustable threshold voltage, and with a comparator to which the threshold voltage and the output signal of the low-pass filter are applied and a switching means controlled by the comparator to which the same output signal of the low-pass filter is applied, the switching means being in a pass condition when the output signal of the low-pass filter exceeds or equals the threshold voltage and in a block condition when the output signal of the low-pass filter is smaller than the threshold voltage.

4. A receiver device particularly suitable for application in a radar apparatus wherein said device is coupled to an antenna and wherein said receiver device includes a receiving unit provided with a broadband preamplifier stage and wherein said broadband preamplifier stage receives an input and provides a broadband output signal, said receiver device comprising:
   a bandwidth limiting element coupled to receive said output signal from said broadband preamplifier stage;
   a jamming indicator, operating in a bandwidth substantially equal to the preamplifier stage bandwidth, for detecting interference signals and generating an interference signal-representing indication signal suitable for controlling an indication means for displaying, wherein said jamming indicator has an input for receiving said output signal from said broadband preamplifier stage and wherein said input is connected between said broadband preamplifier stage and said bandwidth-limiting element, said jamming indicator being provided with means for suppressing radar echo signals so that the indication signal substantially exclusively represents interference signals.

5. A receiver device as claimed in claim 4, wherein said means comprises a rectifier circuit coupled to the receiving unit, a low-pass filter coupled to the output of the rectifier circuit and, coupled to the output of the low-pass filter, an adjustable threshold circuit which generates the indication signal.

6. A receiver device as claimed in claim 5, wherein the threshold circuit is provided with a threshold voltage generator which generates an adjustable threshold voltage, a comparator to which the threshold voltage and the output signal of the low-pass filter are applied and a switching means controlled by the comparator, to which the same output signal of the low-pass filter is applied, the switching means being in a pass condition when the output signal of the low-pass filter exceeds or equals the threshold voltage and in a block condition when the output signal of the low-pass filter is smaller than the threshold voltage.

* * * * *